United States Patent
Zeng

(10) Patent No.: US 8,495,279 B2
(45) Date of Patent: Jul. 23, 2013

(54) FLASH FILE SYSTEM AND DRIVING METHOD THEREOF

(75) Inventor: Huipeng Zeng, Guishan Township (TW)

(73) Assignees: MiTAC International Corp., Kuei San Hsiang (TW); MiTAC Research (Shanghai) Ltd., Shanghai (CN)

( * ) Notice: Subject to any disclaimer, the term of this patent is extended or adjusted under 35 U.S.C. 154(b) by 675 days.

(21) Appl. No.: 12/560,369

(22) Filed: Sep. 15, 2009

(65) Prior Publication Data

US 2010/0199026 A1   Aug. 5, 2010

(30) Foreign Application Priority Data

Feb. 4, 2009   (TW) .............................. 98103552 A

(51) Int. Cl.
*G06F 12/00*   (2006.01)
(52) U.S. Cl.
USPC .................................. 711/103; 711/E12.008
(58) Field of Classification Search
USPC ....................................................... 711/103
See application file for complete search history.

(56) References Cited

U.S. PATENT DOCUMENTS

| | | | |
|---|---|---|---|
| 7,124,238 B2 * | 10/2006 | Hong | 711/103 |
| 2005/0235106 A1 * | 10/2005 | Kimura | 711/112 |
| 2006/0168392 A1 * | 7/2006 | Hwang | 711/103 |
| 2007/0136509 A1 * | 6/2007 | Agami | 711/103 |
| 2009/0055578 A1 * | 2/2009 | Lee et al. | 711/103 |
| 2009/0132755 A1 * | 5/2009 | Radke | 711/103 |
| 2009/0172264 A1 * | 7/2009 | Chung et al. | 711/103 |

* cited by examiner

*Primary Examiner* — Reginald Bragdon
*Assistant Examiner* — Aracelis Ruiz
(74) *Attorney, Agent, or Firm* — Wang Law Firm, Inc.; Li K. Wang; Stephen Hsu

(57) ABSTRACT

The present invention discloses a flash file system and drive method thereof, characterized in that, after reception of an access function, it verifies the parameters in the access function and analyzes the file name of the file to be accessed included therein, then queries the starting position of the file to be accessed, and finally controls a physical driver module to access data from the flash according to the starting position and such parameters. The flash file system according to the present invention does not require FAT (File Allocation Table) file system and block interface, thereby simplifying the complexity of file system and enhancing system performance.

8 Claims, 5 Drawing Sheets

FLASH FILE SYSTEM AND DRIVING METHOD THEREOF

BACKGROUND OF THE INVENTION

1. Field of the Invention

The present invention generally relates to a flash file system and a driving method thereof; in particular, it relates to a flash file system and a driving method thereof which does not require the use of File Allocation Table (FAT) tile system and block interface.

2. Description of Related Art

Current NAND flash driving methods all adopt the architecture of Block Interface Driver layer plus File System Driver (FSD) layer, as shown in FIG. 1. The client layer 11 sends an access function having standard interface to the file system driver layer 12, and the file system driver layer 12, according to the parameters in the access function, controls the physical layer 14 via the block interface driver layer 13 to read data or write data from/into the flash 15. The physical layer 14 includes a flash translation layer (FTL) 141, a virtual file layer (VFL) 142 and a flash interface layer (FIL) 143.

Conventional file system driver layers mostly use the FAT file system. FAT file system provides powerful capabilities, enabling supports for functions such as basic file management, directory management, file attribution management, intelligent space management and the like, as well as supports for file operations, e.g. copy, deletion and editing etc. However, the implementation of the FAT file system is also relatively complicated, in which the file managed by the FAT file system is usually partitioned into blocks in unit of clusters, such blocks being discontinuous, dispersed in each area across the entire disk; for each file read/write operation, it involves in file/directory queries, performing required searches on a file allocation table so as to locate the positions of dispersed clusters, then respectively reading them, causing massive amount of code execution, thus affecting system performance to a certain extent. Specifically, after a certain duration in time of system use, as files with discontinuous clusters in blocks, i.e. disk fragments, accumulating more and more, each file read/write needs to first look up positions of massive disk fragments, thus reducing the performance of the system.

Furthermore, the advantage of using the block interface driver layer is the good compatibility, allowing to analogously infer the storage material as a physical device written/read in blocks composed of sectors, without considering whether there exist any special attributes in the physical material of such a storage material. Whereas, during the process of transferring data in the physical layer of any physical device to the client, it is required to add an operation of block interface conversion, thus losing the flexibility for adapting the physical layer interface by the upper system, causing such a physical device not to be able to perform write/read operations in accordance with the physical features most suitable for itself, consequently affecting the file system performance or even entire capability.

SUMMARY OF THE INVENTION

In view of the aforementioned problems in the prior art, one objective of the present invention is to provide a flash file system and a driving method thereof, so as to reduce system complexity and improve system performance.

To achieve the above-said objective, the present invention further provides a flash file system to allow a host to perform data accessing to a flash. The flash file system comprises an application programming interface module, a physical driver module, a file data table, a file system driver module and a virtual disk driver module. The application programming interface module receives an access function from a host, and verifies the parameters in the received access function, while the physical driver module is used to perform data accessing to the flash. The file data table records the file data stored in the flash, and the file system driver module analyzes the file name of the file to be accessed included in the access function, and queries the file data table for the starting position of the file to be accessed. The virtual disk driver module controls the physical driver module, and performs data accessing to the flash according to the starting position and such parameters.

Additionally, the present invention further provides a driving method for the flash file system, comprising the following steps: Initially, receiving an access function from an application programming interface, verifying the parameters included in the received access function, and then analyzing the file name of the file to be accessed included in the access function. Subsequently, querying a file data table for the starting position of the file to be accessed, and then controlling a physical driver module and performing data accessing to the flash according to the starting position and such parameters.

DETAILED DESCRIPTION OF THE PREFERRED EMBODIMENTS

Figure 1:
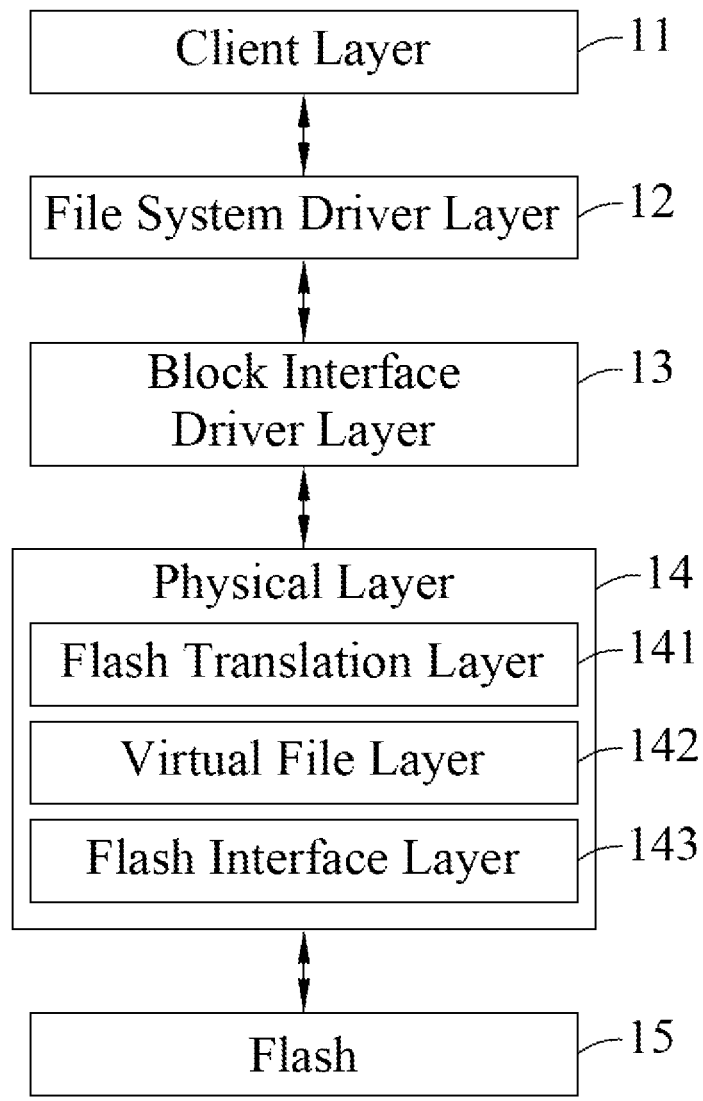
FIG. 1 is a diagram of a prior art flash driver architecture.
Figure 2:
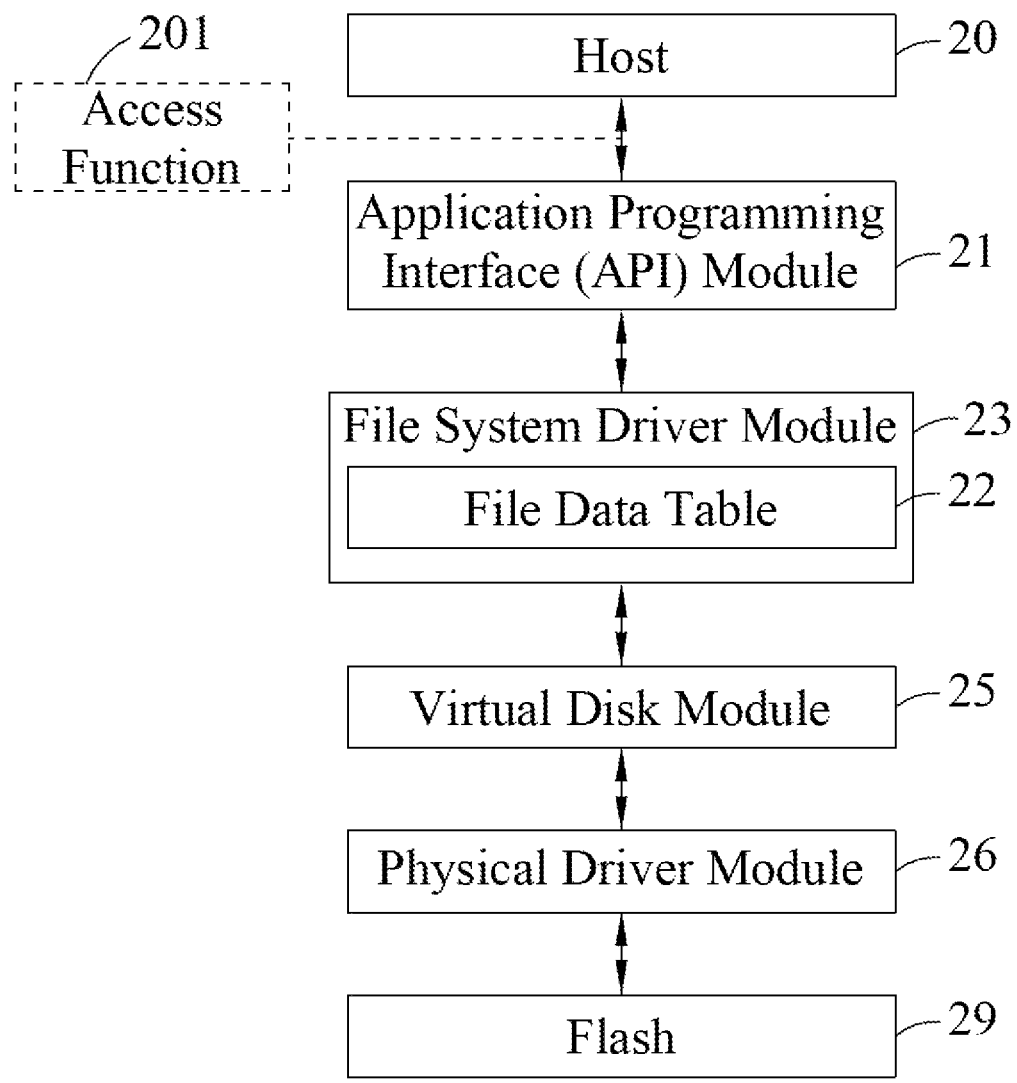
FIG. 2 shows a diagram for an embodiment of the flash file system according to the present invention.

Refer to FIG. 2, wherein a block diagram of the file access system according to the present invention is shown. In the figure, the flash file system according to the present invention allows a host 20 to perform data accessing to a flash 29. The flash file system comprises an application programming interface module 21, a file data table 22, a file system driver module 23, a virtual disk driver module 25 as well as a physical driver module 26. The application programming interface module 21 receives an access function 201 for the host 20, and verifies the parameters included in the access function 201. The file system driver module 23 analyzes the file name of the file to be accessed included in the access function 201, and queries the file data table 22 for the starting position of the file to be accessed. The virtual disk driver module 25 controls the physical driver module 26, and performs data accessing to the flash 29 according to the starting position and such parameters. For example, in certain applications, there are some read-only data which never require to be modified once written, e.g. map data in the Global Positioning System (GPS) navigation software. Besides, such data may not need to have directory structure. Therefore, in tins case, such a complicated system as the file allocation table (FAT) file system is not necessary. Hence, the present invention can simplify the file system, further enable higher read/write speed and reduce product cost.

In practical implementations, regarding to the operating system (such as WinCE) at the host 20 (e.g. portable device), the storage manager of the operating system is responsible for file management tasks, and a standard callback function interface is defined between the flash file system according to the present invention and the storage manager. During file operations performed by a user, it will first enter the application programming interface module of the flash file system via the storage manager. When the user uses a standard application programming interface (API) to create a file, such as by using CreatFile (L\\myfsd\1.txt, relevant parameters) to create a 1.txt file, the operating system and the storage manager will first determine the block to which the file that the user intends to create belongs, herein the example \\myfsd is assumed as the block managed by the flash file system. And then, through the interface connection with the flash file system, the access function 201 (e.g. FSD_CreateFileW) for file creation is transferred to the API module 21. After reception of the access function 201 by the API module 21, it verifies the parameters included in the access function 201, and then the file system driver module 23 queries the file data table 22 to check whether any file with this file name currently exists in the flash 29 and returns the check result.

Taking data reading for example, when the client uses the API to read a file, e.g. by a ReadFile (control code, relevant parameters, read size) function, the operating system and the storage manager at the host will first determine whether the parameters set in the function are valid; if yes, then such parameters will allow to transfer the access function 201 (e.g. FSD_ReadFileW) for reading the contents of the file to the API module 21 through the interface connection with the flash file system. Herein the major parameters are control code and read size.

The file system driver module 23 enters into the stage of data reading based on the control code, in which it is possible to get the file size, position and offset to the last read through the control code, then adding the read size of the current read operation, thus the file system driver module 23 can calculate the starting position of data read as well as amount of data read, then it calls the virtual disk driver module 25 which provides byteunit reading function. The virtual disk driver module 25 is responsible for byte-to-page translations, and controls the physical driver module 26 to read data in unit of pages directly from the flash 29 according to the starting position and parameters.

Taking data writing for example, when the client uses the API to write a file, e.g. by a WriteFile (control code, relevant parameters, write size) function, the operating system and the storage manager at the host will first determine whether the parameters submitted by the client are valid; if yes, then such parameters will allow to transfer the access function 201 (e.g. FSD_WriteFileW) for writing the contents of the file to the API module 21 through the interface connection with the flash file system. Herein the major parameters of the file write function are control code and write size. The file system driver module 23 enters the stage of data writing based on the control code, in which the file size, position and offset to the last write can be appreciated through the control code, adding the write size of current operation, thus the file system driver module 23 can calculate the starting position of the data to be written and the amount of data to be written, then the virtual disk driver module 25 is called to enable the virtual disk driver module 25 to control the physical driver module 26, so as to perform the move operation of pages and blocks on the flash 29 according to the starting position and parameters, which directly writes data in unit of pages to the flash 29.

Figure 3:
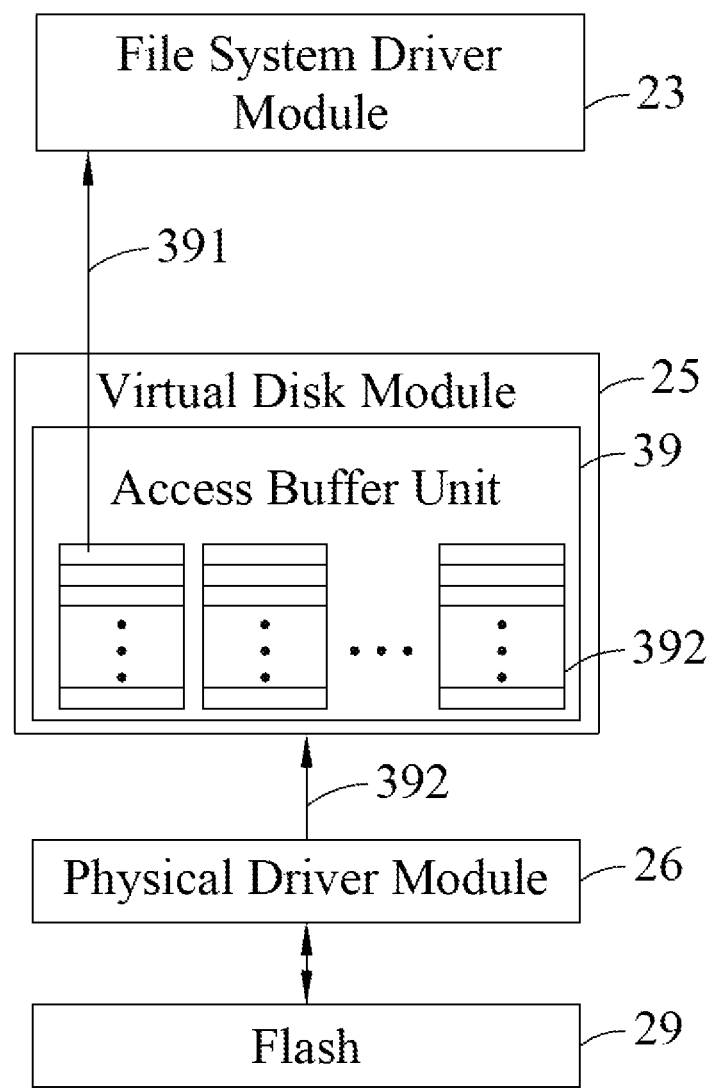
FIG. 3 shows a diagram for an embodiment of the virtual disk driver module in the flash file system according to the present invention.

Refer next to FIG. 3, wherein a diagram of an embodiment for the virtual disk driver module according to the present invention is shown. Since the present invention does not use the block interface layer, the physical interface between the physical driver module and the flash operates in unit of pages. Therefore, in order to perform data reading/writing in unit of bytes, the virtual disk driver module 25 plays the role of intermediate layer therebetween. In the figure, it is shown that the virtual disk driver module 25 further includes an access buffer unit 39 for data buffering. It is because, as the data requested to be read by the client is less than a page, the physical driver module 26 still need to read the data 392 in unit of pages. As a result, the page data 392 read therein will be first temporarily stored in the access buffer unit 39, and when the client requests partial bytes 391 in the page data 391 once again, the virtual disk driver module 25 then first verifies whether the data requested by the client still exist in the access buffer unit 39; if yes, then it reads the data 39 in unit of bytes from the access buffer unit 39 and returns them to the client. In this way, it can effectively enhance the read performance of the flash file system according to the present invention. Herein the access buffer unit 39 can be implemented by means of a buffer memory.

Figure 4:
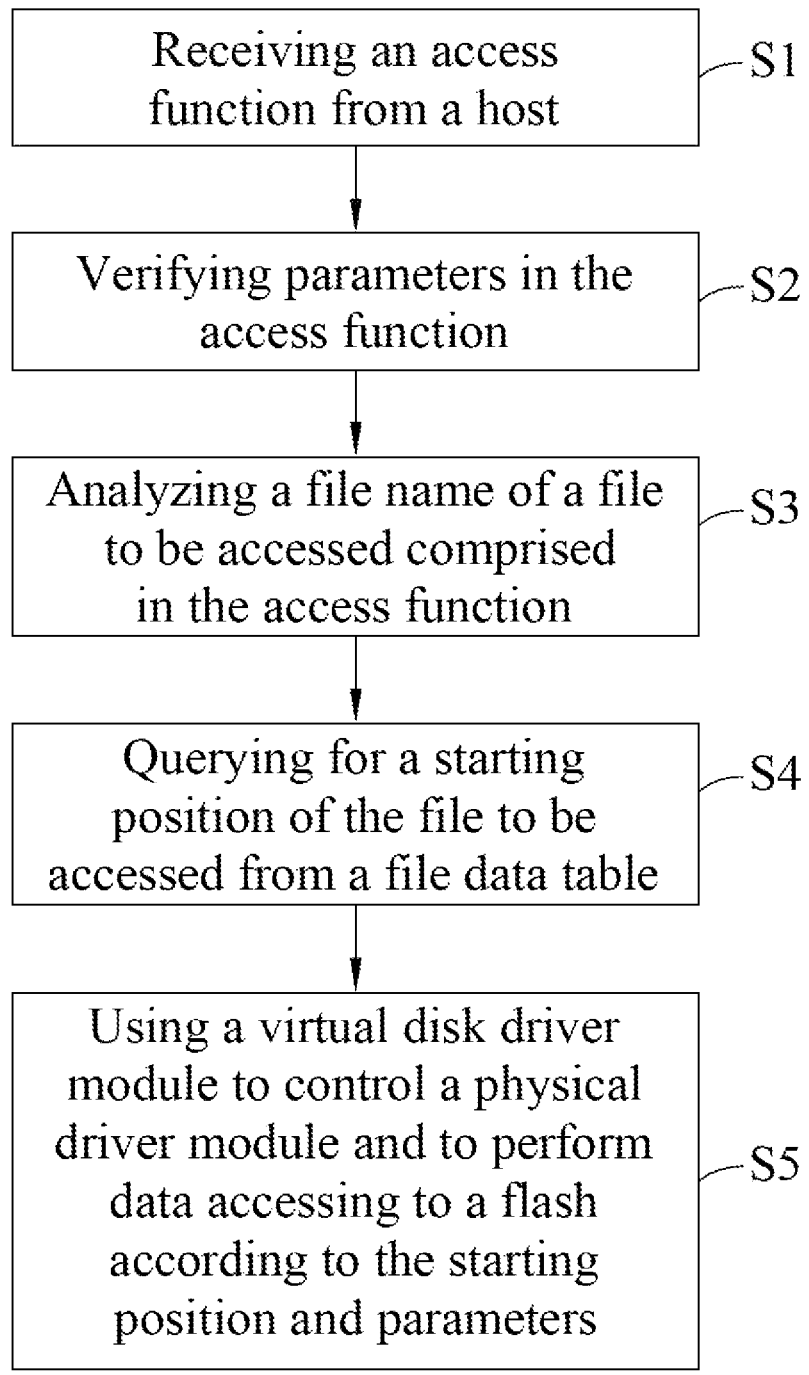
FIG. 4 shows a step-wise flowchart for the driving method of the flash file system according to the present invention.

Refer now to FIG. 4, wherein a step-wise flowchart for the drive method of the flash file system according to the present invention is shown. In the figure, it can be seen that the method comprises the following steps. Initially, at step S1, an access function from a host is received. In implementations, when a client uses the standard application programming interface (API) to perform data creation, data reading or data writing, the operating system and storage manager at the host will transfer the access function, e.g. file creation function (FSD_CreateFileW), file read function (FSD_ReadFileW) or file write function (FSD_WriteFileW), to the API module 21 shown in FIG. 2. Subsequently, at step S2, the parameters held in the access function are verified. In implementations, the API module 21 shown in FIG. 2 offers the feature of parameter verification.

At step S3, the file name of the file to be accessed comprised in the access function is analyzed. At step S4, the starting position of the file to be accessed is queried from a file data table. Besides, at step S4, a sub-step of determining from a file data table whether the file to be accessed exists in the flash may also be included.

At step S5, a virtual disk driver module is used to control the physical driver module, and data accessing to the flash according to the starting position and such parameters is performed. The virtual disk driver module is responsible for byte-to-page translations, and controls the physical driver module to read data in unit of pages directly from the flash. Furthermore, at step S5, it may also store first the data read in unit of pages in the access buffer unit 39 within the virtual disk driver module, then acquire the corresponding pre-accessed data of the access function from the access buffer unit 39.

Herein the file data table may optionally record the number of files stored in the flash, or the last file position recorded in the flash. When the access function is a file creation function, it sequentially adds a new file from the last file position in the flash.

Figure 5:
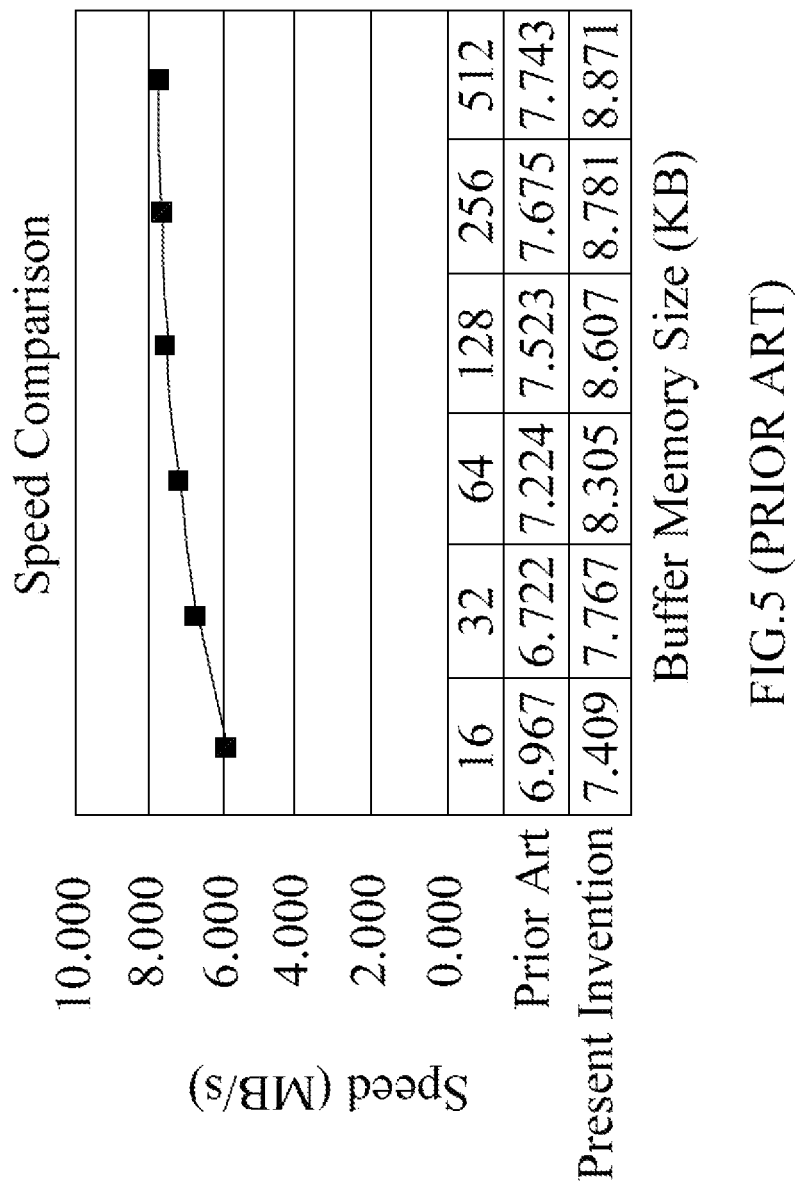
FIG. 5 shows a data comparison diagram of the flash file system according to the present invention and a prior art configuration.

In summary, the flash file system and drive method thereof according to the present invention enables direct connection between file system and physical driver module, significantly reducing data conversion and system adaption, thereby enhancing processor performance and allowing the data accessing provided by the flash file system according to the present invention to be more efficient than prior art configuration, as shown in FIG. 5. Furthermore, in case that the client needs even faster data accessing speed, it is possible to expand the size of buffer memory in the virtual disk driver module 25, thus further accelerating data accessing operations, as also shown in FIG. 5.

The aforementioned texts are merely exemplary, rather than being of limitation. All equivalently effective modifications, alternations or changes performed upon the present invention without departing from the spirits and scopes thereof are deemed to be encompassed by the following claims.

What is claimed is:

1. A flash file system allowing a host to perform data accessing to a flash, the flash file system comprising:
   an application programming interface (API) module receiving an access function inputted from the host and verifying parameters in the access function, wherein the parameters comprises control code and read/write size;
   a physical driver module performing data accessing to the flash;
   a file data table recording file data stored in the flash;
   a file system driver module analyzing a file name of a file to be accessed included in the access function, and querying the file data table for a starting position of the file to be accessed; and
   a virtual disk driver module controlling the physical driver module, and performing data accessing to the flash according to the starting position and the parameters, wherein the virtual disk driver module performs byte-to-page translations while engaging in data reading/writing operations, and comprises an access buffer unit temporarily storing at least one page of data read from the flash;
   wherein the physical driver module performs data reading or writing on the flash by pages;
   wherein the control code comprises file size, position and offset to the last read/write, and when performing data accessing operations, the file system driver module based on the control code and the read/write size to calculate the starting position of data read/written as well as amount of data read/written, then the file system driver module calls the virtual disk driver module to perform the byte-to-page translations while engaging in data reading/writing operations.

2. The flash file system according to claim 1, wherein the file data table further records an amount of files stored in the flash.

3. The flash file system according to claim 1, wherein the file data table further records a last file position.

4. The flash file system according to claim 3, wherein while the access function is a file creation function, the file system driver module sequentially adds a new file from the last file position in the flash.

5. A drive method for a flash file system comprising:
   receiving an access function from a host;
   verifying parameters in the access function;
   analyzing a file name of a file to be accessed included in the access function;
   querying for a starting position of the file to be accessed from a file data table;
   using a virtual disk driver module to control a physical driver module and to perform data accessing to the flash according to the starting position and the parameters, wherein the parameters comprises control code and read/write size; and
   using the virtual disk driver module to perform byte-to-page translations while engaging in data reading/writing operations;
   wherein the virtual disk driver module comprises an access buffer unit temporarily storing at least one page of data read from the flash;
   wherein the physical driver module performs data reading or writing on the flash by pages;
   wherein the control code comprises file size, position and offset to the last read/write, and when performing data accessing operations, the file system driver module based on the control code and the read/write size to calculate the starting position of data read/written as well as amount of data read/written, then the file system driver module calls the virtual disk driver module to perform the byte-to-page translations while engaging in data reading/writing operations.

6. The drive method according to claim 5, wherein the file data table further records an amount of files stored in the flash.

7. The drive method according to claim 5, wherein the file data table further records a last file position.

8. The drive method according to claim 7, wherein further comprising a step of sequentially adding a new file from the last file position in the flash while the access function is a file creation function.

* * * * *